US012658578B2

(12) United States Patent
Vollmer

(10) Patent No.: US 12,658,578 B2

(45) Date of Patent: Jun. 16, 2026

(54) MULTI-BAND ANTENNA AND BASE STATION

(71) Applicant: Telefonaktiebolaget LM Ericsson (publ), Stockholm (SE)

(72) Inventor: Andreas Vollmer, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

(21) Appl. No.: 18/293,833

(22) PCT Filed: Aug. 11, 2021

(86) PCT No.: PCT/EP2021/072393

§ 371 (c)(1),
(2) Date: Jan. 31, 2024

(87) PCT Pub. No.: WO2023/016640

PCT Pub. Date: Feb. 16, 2023

(65) Prior Publication Data

US 2025/0105508 A1 Mar. 27, 2025

(51) Int. Cl.

*H01Q 5/28* (2015.01)
*H01Q 1/24* (2006.01)
*H01Q 9/16* (2006.01)

(52) U.S. Cl.

CPC ............... *H01Q 5/28* (2015.01); *H01Q 1/246* (2013.01); *H01Q 9/16* (2013.01)

(58) Field of Classification Search

CPC ........... H01Q 5/28; H01Q 5/42; H01Q 1/246; H01Q 1/1207; H01Q 9/16; H01Q 19/108; H01Q 21/26

See application file for complete search history.

(56) References Cited

U.S. PATENT DOCUMENTS

2019/0044243 A1 2/2019 Vollmer et al.

FOREIGN PATENT DOCUMENTS

| | | | | | |
|---|---|---|---|---|---|
| CN | 103503231 | A | * | 1/2014 | ............. H01Q 19/24 |
| DE | 102016001327 | A1 | * | 8/2017 | ............. H01Q 21/24 |
| WO | WO-2015029946 | A1 | * | 3/2015 | ............. H01Q 21/26 |
| WO | WO-2016204821 | A1 | * | 12/2016 | ............. H01Q 21/30 |
| WO | 2020057498 | A1 | | 3/2020 | |
| WO | 2020135537 | A1 | | 7/2020 | |

OTHER PUBLICATIONS

International Search Report and Written Opinion for International Patent Application No. PCT/EP2021/072393, mailed Apr. 21, 2022, 10 pages.

* cited by examiner

*Primary Examiner* — Seokjin Kim

(74) *Attorney, Agent, or Firm* — Withrow & Terranova, PLLC

(57) ABSTRACT

A multi-band antenna has a first band assembly and at least one second band assembly, wherein the first band assembly comprises a first support and at least one first radiator for frequencies in a first frequency band, wherein the second band assembly comprises a second support and at least one second radiator mounted to the second support for frequencies in a second frequency band, wherein the second support is arranged below the first support, and wherein the at least one second radiator extends through an associated cut-out in the first support and further from the top side of the first support upwards. Further, a mobile communication base station is provided.

15 Claims, 4 Drawing Sheets

MULTI-BAND ANTENNA AND BASE STATION

This application is a 35 U.S.C. § 371 national phase filing of International Application No. PCT/EP2021/072393, filed Aug. 11, 2021, the disclosure of which is incorporated herein by reference in its entirety.

TECHNICAL FIELD

The invention relates to a multi-band antenna, in particular a radiofrequency mobile communication antenna, as well as to a mobile communication base station having such an antenna.

BACKGROUND

The requirements for mobile telecommunication antennas rise continuously. In the future, antennas have to operate over a wide frequency range, whereas the space available for the antennas in the base station does not increase. This requires so-called interleaved antennas meaning that antenna arrays with different frequencies are interleaved with one another. Such interleaved arrays, however, are complex to manufacture as not only the radiators but also the feeding networks have to be interleaved.

Further, antennas provided as integrated molded devices, which are easy to manufacture, are known, for example from WO 2020/135537 A1.

SUMMARY

It is the object of the invention to provide a multi-band antenna and a base station that are compact and can be manufactured cost efficiently.

For this purpose, a multi-band antenna, in particular a radio frequency mobile communication antenna is provided. The antenna comprises a first band assembly and at least one second band assembly. The first band assembly comprises a first support and at least one first radiator for frequencies in a first frequency band, the at least one first radiator extends from a top side of the first support upwards. The second band assembly comprises a second support and at least one second radiator mounted to the second support for frequencies in a second frequency band. The second support is arranged below the first support, and wherein the first support comprises at least one cut-out associated with the at least one second radiator, and the at least one second radiator extends through the associated cut-out in the first support and further from the top side of the first support upwards.

The inventors have realized that a simple and cost-efficient construction can be realized by providing radiators for different frequency bands on different supports, wherein the radiators for one of the frequency bands can be passed through openings in the support for radiators of another frequency band. This simplifies the manufacturing of a multi-band antenna drastically, as the space between the supports can be used for the distribution networks.

The second radiator extends in particular from the top side of the second support. For example, the first radiator and/or the second radiator extend in particular perpendicularly to the first and/or second support.

For example, the frequency band of the first band has lower frequencies than the frequencies of the second band.

In particular, the at least one second radiator has a height above the top side of the first support smaller than the height of the at least one first radiator above the top side of the first support.

In an aspect, the first support provides a reflector, in particular a reflector plate, for the at least one first radiator and the at least one second radiator so that the advantages of a common reflector can still be used.

In an embodiment of the invention, the top side of the first support, in particular of a substrate of the first support, and/or the top side of the second support, in particular of a substrate of the second support, comprises a metallization, in particular wherein the metallization on the top side is applied to the respective surface, providing improved shielding and/or reflection properties.

The metallization may cover more than 80%, in particular more than 90% of the respective top side. The metallization may be applied in form of a mesh or grid of metal material on the respective top side.

The substrate of the first and/or second support may have a thickness larger than 0.3 mm, preferably larger than 0.4 mm, more preferably larger than 0.5 mm and/or smaller than 1 mm, preferably smaller than 2 mm, more preferably smaller than 3 mm, even more preferably smaller than 4 mm, even more preferably smaller than 5 mm and even more preferably smaller than 6 mm.

In order to reduce crosstalk and interference, the first feeding lines for the at least one first radiator may be arranged on the first support, in particular on the bottom side of the substrate of the first support; and/or the second feeding lines for the at least one second radiator may be arranged on the second support, in particular on the bottom side of the substrate of the second support.

The feeding lines may also be applied to the surface.

In another aspect, the first support and the second support are parallel to each other, in particular wherein the first support and the second support are spaced apart by a gap forming a shielded area, more particularly wherein the first support and/or the second support comprises a protrusion abutting the other support for defining the gap.

In particular, the feeding lines for at least one first radiator and/or at least one second radiator are arranged in the gap.

In an embodiment, the at least one first radiator and/or the at least one second radiator comprises a substrate, in particular made of a dielectric, and at least one conductor being applied to the substrate, in particular wherein the at least one conductor is applied to a surface of the substrate perpendicular to the first support. This way, manufacturing the antenna may be simplified further.

The first and/or second radiator may be a single molded integrated device (MID).

The substrate may be a material used for printed circuit boards or molded integrated devices. For example, the substrate is made of a thermoplastic material suited for MID, for example Polyphenylene Sulfide (PPS).

In particular, the substrates extend perpendicular to first support and/or the height of substrate above the first support is the height of respective radiator.

In the context of this disclosure the term “applied” means in particular that the material of the conductor is deposited onto the respective surface of the substrate, either immediately or on top a priming layer or the like. Possible deposition techniques may be (PE-)CVD, sputtering, or the like. The conductors may also be applied to the substrate in a galvanization process, preferably by electroplating or electroless plating.

For ease of manufacturing, the first support, in particular a substrate of the first support, and the substrate of the at least one first radiator may be of a single piece and/or the second support, in particular a substrate of the second support, and the substrate of the at least one second radiator are of a single piece.

In order to simplify the antenna even further, the first band assembly and/or the second band assembly is a molded integrated device.

In an aspect of the invention, the at least one second radiator, in particular the substrate of the second radiator, has an outer contour in a top view, wherein the contour of the corresponding cut-out in the first support corresponds to the contour of the at least one second radiator. This way, the area of the cut-outs can be held at a minimum.

The contour may have a cross shape.

The width of the cut-outs is wider than the thickness of the substrate of the second radiators that pass through the cut-out, for example 2 mm wider, preferably 4 mm wider, more preferably 6 mm wider, even more preferably 8 mm wider, even more preferably 10 mm wider and even more preferably 12 mm wider.

In an embodiment of the invention, the at least one first radiator and/or the at least one second radiator is a dual-polarized radiator having four conductors mounted on a substrate forming dipole halves aligned around a center in a cross shape, providing a very efficient radiator.

For enhanced functionality, the dual-polarized radiators may have a linear polarization with a polarization plane, wherein the contour of the cut-outs extend in or parallel to the polarization plane.

To reduce the amount of space needed, the antenna may comprise four second radiators associated with and arranged around the first radiator, in particular wherein one of the dipole halves of each second radiator is arranged in overlap of one of the dipole halves of the associated first radiator.

The overlap is to be understood with respect to a top view.

In another aspect, the conductors of the second radiators forming one of the dipole halves associated with the first radiator are each provided on the respective substrate of the first radiator providing one of the dipole halves of the respective first radiator, in particular below the dipole halves of the respective first radiator. This way, the construction is simplified further.

In this case, the second radiator may have three substrates but four dipole halves.

In an embodiment, the first support comprises a metal plate and/or wherein a bottom plate, in particular a metal plate, is attached to the second support. This way, a simple design is provided.

The bottom plate is in particular attached to the bottom side of the second support.

For establishing antenna arrays, one of the at least one first radiator and associated second radiators of the at least one second radiators may form a single cell, wherein the antenna comprises a plurality of cells, in particular arranged in a row or a grid.

Further, for above purpose, a mobile communication base station having an antenna as described above is provided.

The features and advantages discussed with respect to the antenna also apply to the base station and vice versa.

BRIEF DESCRIPTION OF THE DRAWINGS

Further features and advantages will be apparent from the following description as well as the accompanying drawings, to which reference is made. In the drawings.

DETAILED DESCRIPTION

Figure 1:
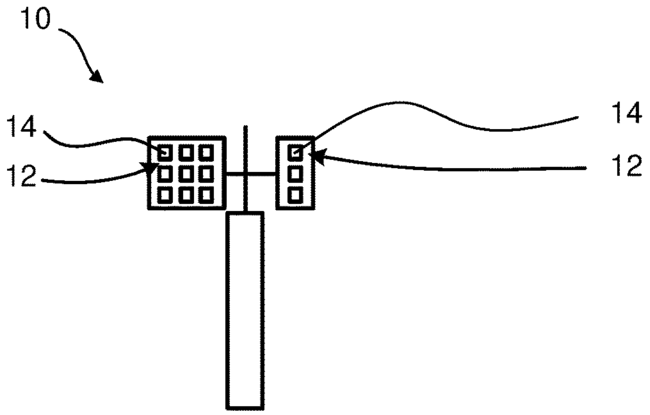
FIG. 1: shows a mobile communication base station according to the invention with a multi-band antenna according to the invention.

FIG. 1 shows very schematically a mobile communication base station 10 according to the invention having multiple cells 12 comprising a multi-band antenna 14 according to the invention each.

A band is understood as a resonance frequency range, preferably defined as a continuous range with return loss of better than 10 dB and preferably better than 15 dB. Two different bands are understood as two different frequency ranges.

The base station 10 is, for example, a base station of a radio frequency mobile communication network.

Two exemplary arrangements of the cells 12 are shown in FIG. 1, namely the arrangement in a row (left-hand side) or in a grid (right-hand side).

Figure 2:
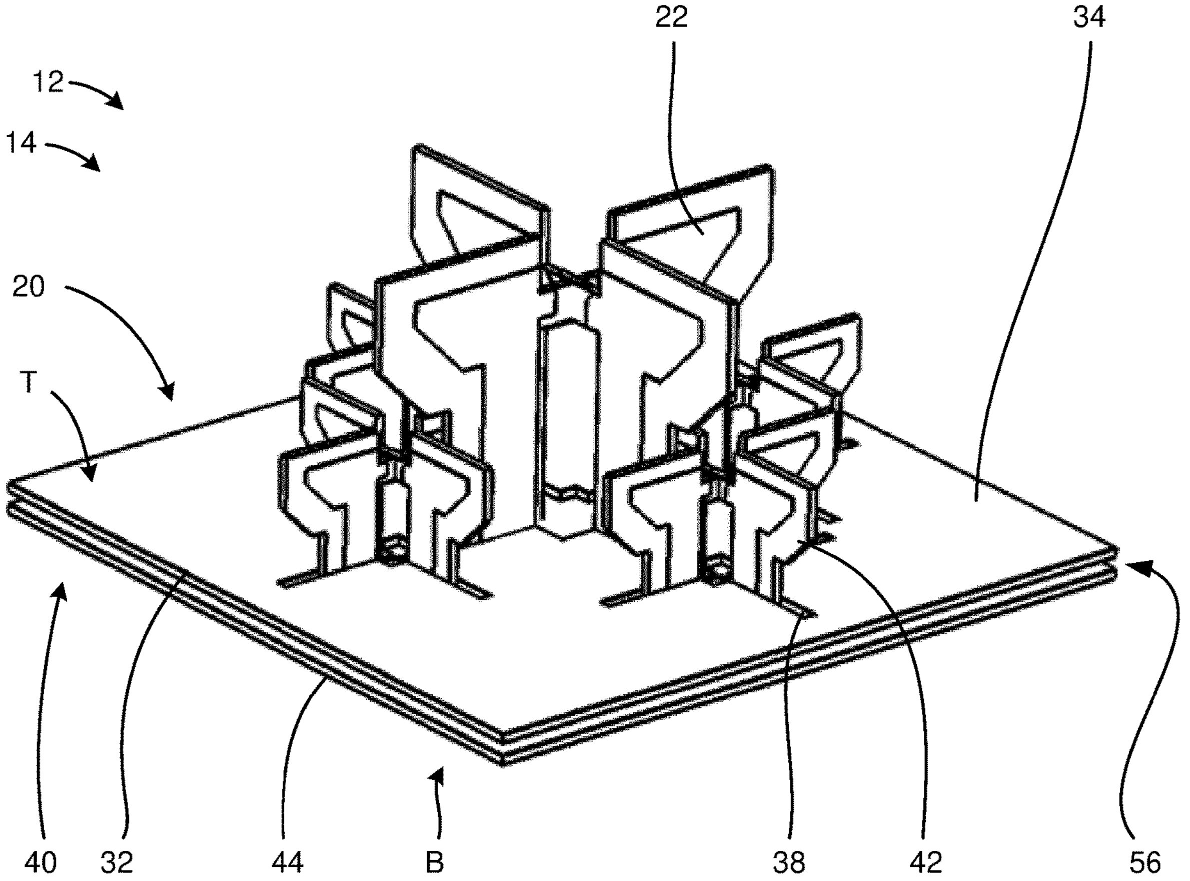
FIG. 2: shows schematically a multi-band antenna according to the invention in a perspective view.
Figure 3:
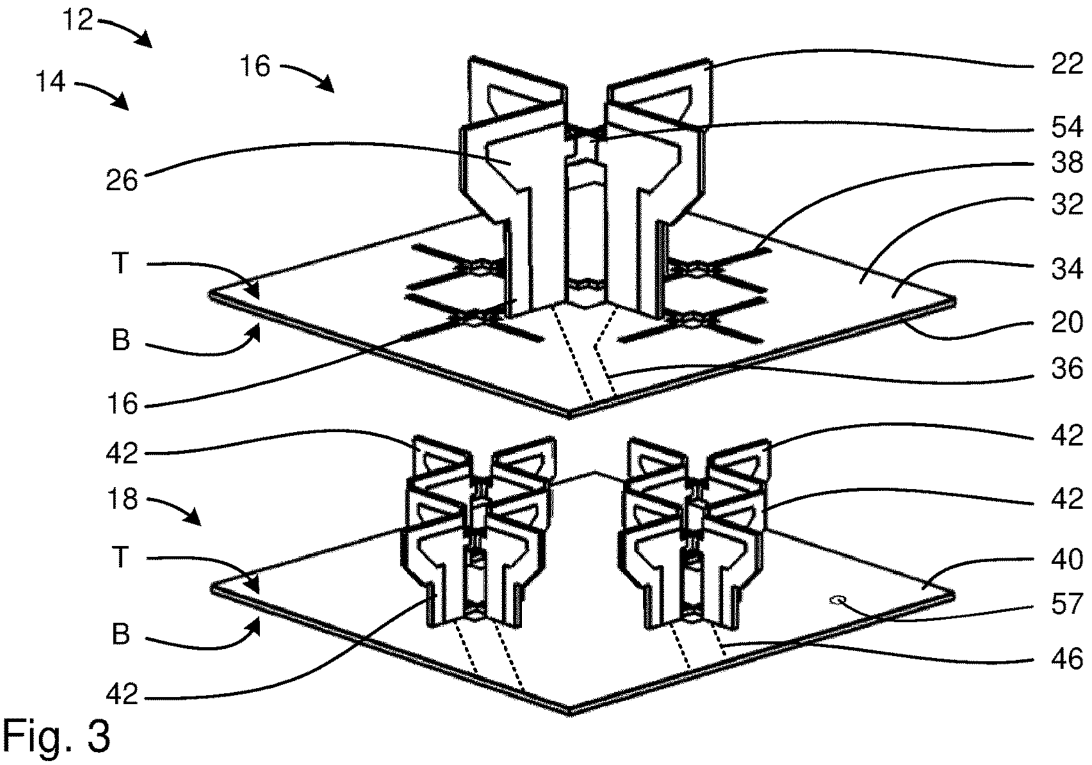
FIG. 3: shows the antenna of FIG. 2 in an exploded view.

FIGS. 2 and 3 show a multi-band antenna 14 forming a cell 12 in a perspective and exploded view, respectively.

The multi-band antenna 14 comprises a first band assembly 16 and a second band assembly 18.

Figure 4:
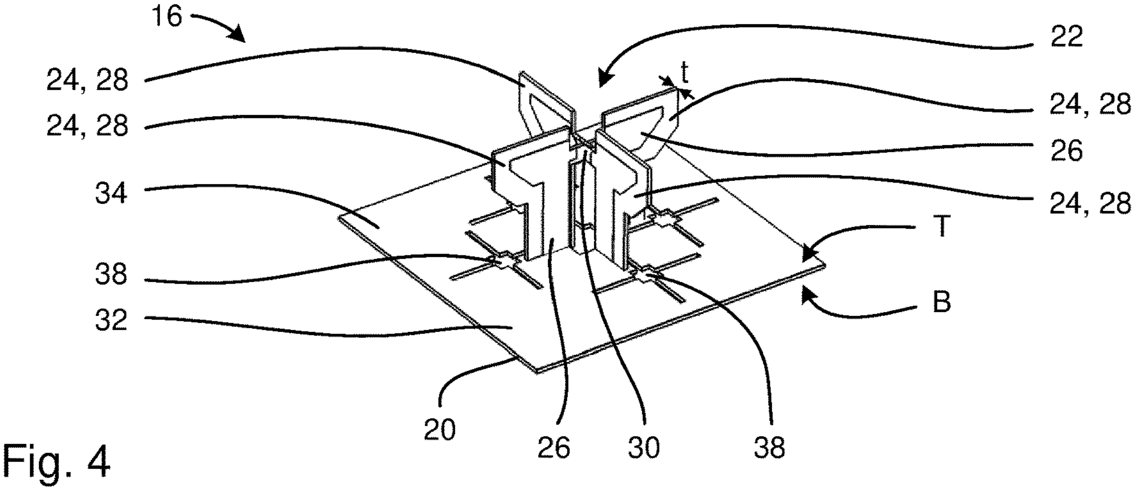
FIG. 4: shows a first band assembly of the antenna according to FIG. 2 in a perspective view.
Figure 5:
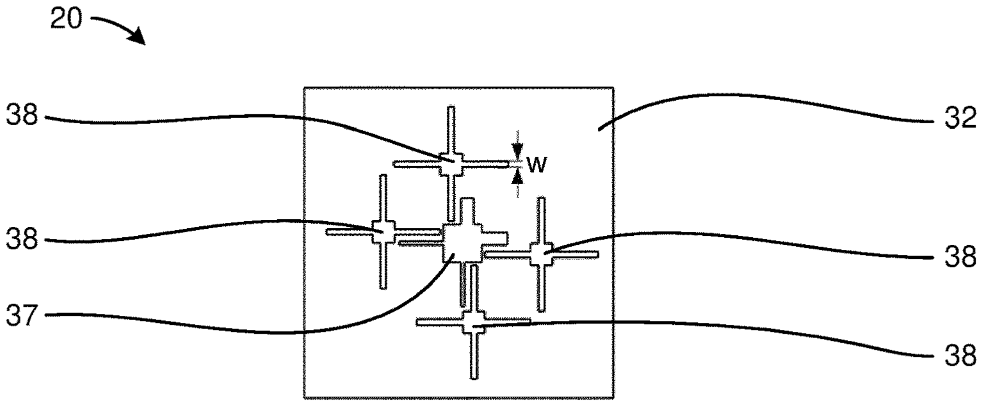
FIG. 5: shows a top view of a first support of the first band assembly according to FIG. 4, FIG. 6: shows a second band assembly of the antenna according to FIG. 2 in a perspective view.

The first band assembly 16 is shown in FIGS. 4 and 5 and comprises a first support 20 and a first radiator 22. In the shown embodiment, the first band assembly 16 has only one first radiator 22.

The first radiator 22 is designed for frequencies in a first frequency band and it is a dual polarized radiator having a substrate 24 and conductors 26.

The substrate 24 is made from a plate-shaped dielectric material, for example PCB (Printed Circuit Board) material or thermoplastics material suited for MID, for example a thermoplastic material like Polyphenylene Sulfide (PPS).

The substrate 24 forms wings 28 and a bridge 30. Seen in a top view, the wings 28 are arranged in a cross around a center and extend perpendicularly from the first support 20.

At least the opposite ones of the wings 28 are connected with one another by the bridge. In the shown embodiment, all four wings 28 are connected by the bridge 30.

On each of the wings 28, a conductor 26 is directly applied to the substrate 24.

Thus, the material of the conductor 26 is deposited onto the respective surface of the respective wing 28. Of course, if the substrate 24 comprises one or more priming or base layers, the conductors 26 are still considered to be applied to the substrate 24.

The conductors 26 may be applied to the substrate 24 by known deposition techniques, for example CVD (Chemical Vapor Deposition), PE-CVD (Plasma-enhanced Chemical Vapor Deposition), sputtering or the like. The conductors 26 may also be applied to the substrate 24 in a galvanization process, preferably by electroplating or electroless plating.

Thus, the first radiator 22 may be a single molded integrated device (MID).

The conductors 26 are arranged on both sides of each wing 28, wherein—on one side of the wing 28—the conductor 26 has a line shape, and on the other side of the wing 28 the conductor 26 covers the surface of the wing 28 almost entirely.

The conductors 26 of opposite wings 28 are electrically connected via a conductor 26 on the bridge 30 and form a dipole of the first radiator 22, i.e. each conductor 26 on one of the wings 28 forms a dipole half.

FIG. 5 shows a top view of the first support 20 without the first radiator 22.

The first support 20 comprises a substrate 32, a metallization 34 and first feeding lines 36.

The substrate 32 of the first support 20 is, for example, also made from a plate-shaped dielectric material, for example PCB (Printed Circuit Board).

The substrate 32 has a plate shape with a top side T and a bottom side B, wherein openings 37 and cut-outs 38 extend through the substrate 32 from the top side T to the bottom side B.

Within this disclosure, the side of the substrate 32 from which the first radiator 22 extends, is considered to be the top side T.

The metallization 34 is applied to the top side T and may cover the surface of the top side T completely.

The first feeding lines 36 are arranged on the bottom side B of the substrate 32 and thus also on the bottom side of first support 20. The first feeding lines 36 are, for example, conductors similar to conductors 26 of the first radiator 22.

Due to the metallization 34, the first feeding lines 36 are microstrip transmission lines.

The metallization 34 and/or the first feeding lines 36 may be directly applied to the substrate 32 of the first support 20 in the same way as explained with respect to the conductors 26 and the substrate 24 of the first radiator 22.

Thus, the first support 20 may also be a molded integrated device (MID), for example a piece separate from the first radiator 22.

It is also possible that the first support 20 and the first radiator 22 together form a single piece, for example a single MID. In this case, the first band assembly 16 is a single MID.

The first radiator 22 extends from the first support 20 on the top side T. The height of the first radiator 22 corresponds to the height of the substrate 24 above the first support 20.

Due to the metallization 34, the substrate 32 and thus the first support 20 functions as a reflector, in particular a reflector plate, for the first radiator 22.

Further, the first feeding lines 36 of the first support 20 connect electrically, in particular galvanically, to the conductors 26 of the first radiator 22 so that a radio frequency signal can fed to the first radiator 22 via the feeding lines 36.

As can be seen in FIG. 5, the opening 37 in the first support 20 is located in the center of the substrate 32.

The opening 37 comprises a central section and two radially extending sections extending from the central section.

The central section is arranged between all four of the wings 28 of the first radiator 22.

The radially extending sections are aligned with one of the wings 28 each such that at least one of the first feeding lines 36 extend through the opening 37 to galvanically connect the conductor 26 of the first radiator 22.

Further, in the shown embodiment, four cut-outs 38 are provided that are arranged circumferentially around the opening 37.

The cut-outs 38 have a cross-shaped contour. In the shown embodiment, the cut-outs 38 have an enlarged central section in the center of the respective cross.

Figure 6:
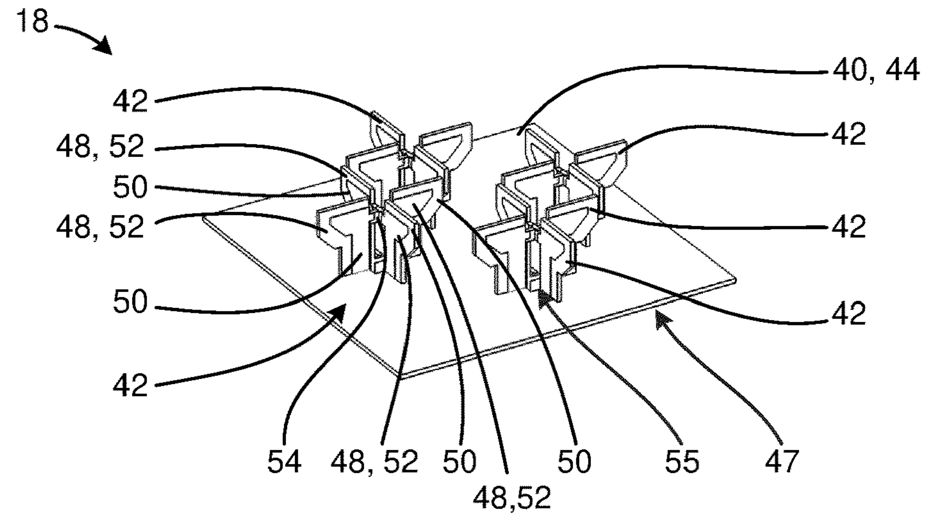

FIG. 6 shows the second band assembly 18 in a perspective view.

Just like the first band assembly 16, the second band assembly 18 comprises a second support 40, a plurality of second radiators 42, in the shown embodiment four second radiators 42, and a plurality of feeding lines 46.

The second support 40 is also comprises a substrate 44 made from a plate-shaped dielectric material, for example PCB material or thermoplastics material suited for MID, for example a thermoplastic material like Polyphenylene Sulfide (PPS).

The substrate 44 has a top side T and a bottom side B, wherein the second radiators 42 extend from the top side T of the second support 40.

The second feeding lines 46 are arranged on the substrate 44 of the second support 40 in much the same way the first feeding lines 36 are arranged on the substrate 32 of the first support 20.

For example, the second feeding lines 46 are arranged on the bottom side B of the second support 40. The second feeding lines 46 may be applied directly to the substrate 44.

The top side T of the substrate 44 of the second support 40 may also be provided with a metallization 47, in particular covering the entire surface of the top side T. In this case, the feeding lines 46 are microstrip transmission lines.

Of course, the second feeding lines 46 may also be on the top side T and the optional metallization 47 on the bottom side B.

The second radiators 42, just like the first radiators 22, each comprise a substrate 48 and conductors 50.

The substrate 24 of the first radiators 22 and/or the substrate 48 of the second radiators 42 may have a thickness t larger than 0.3 mm, preferably larger than 0.4 mm, more preferably larger than 0.5 mm and/or smaller than 1 mm, preferably smaller than 2 mm, more preferably smaller than 3 mm, even more preferably smaller than 4 mm, even more preferably smaller than 5 mm and even more preferably smaller than 6 mm.

The substrate 48 is made from a dielectric substrate, in particular a PCB having a plate shape.

Four wings 52 and a bridge 54 are formed by the substrate 48, wherein the wings 52 are arranged in a cross shape around a center when seen in a top view. Thus, each second radiator 42 has a cross-shaped outer contour.

The four wings 52 are connected by the bridge 54.

In the same way as explained for the first radiator 22, the conductors 50 are arranged on the wings 52 of the substrate 44 of the second radiators 42 forming two dipoles so that the second radiators 42 are dual polarized radiators. The second radiators 42 are designed for frequencies in a second frequency band.

The conductors 50 may also be applied directly to the substrate 48.

The second radiators 42 only and/or the second support 40 only may be a single MID.

Alternatively, the second support 40 and the second radiators 42 are of one piece forming a single MID. Thus, the second band assembly 18 may be a single MID.

The substrate 44 of the second support 40 may have an opening 55 in the center of each second radiator 42 extending through the substrate 44. Parts of the second feeding lines 46 extend through the opening 55 to galvanically connect to the conductors 50 of the dipoles of the second radiators 42.

The openings 55 in the substrate 44 of the second support 40 may have the same contour but smaller as the opening 37 in the first support 20.

When comparing FIGS. 5 and 6, it can be seen that the second radiators 42 are arranged around a center point in the same way as the cut-outs 38 in the first support 20 are arranged around the center.

Thus, for every one of the second radiators 42 a corresponding cut-out 38 is provided in the first support 20 being the associated cut-out 38.

The outer contour of the cut-outs 38 and the outer contour of the corresponding second radiators 42 are complementary to one another so that the second radiators 42 may pass through the respective cut-out 38.

The width w of the cut-outs 38 is wider than the thickness t of the substrate 48 of the second radiators 42, for example 2 mm wider, preferably 4 mm wider, more preferably 6 mm wider, even more preferably 8 mm wider, even more preferably 10 mm wider and even more preferably 12 mm wider.

Further, the dual-polarized radiators have a linear polarization with a polarization plane, wherein the contour of the cut-outs 38 extends in or parallel to the polarization plane.

Turning back to FIGS. 2 and 3, it can be seen that in the assembled antenna 14, each of the second radiators 42 extends through the associated cut-out 38.

The second radiators 42 further extend above the top side T of the first support 20. This way, the second radiators 42 also make use of the metallization 34 of the first support 20 so that the first support 20 serves as a reflector plate for the first radiator 22 as well as for the second radiators 42.

The height of the second radiators 42 above the top side T of first support 20 is smaller than the height of the first radiator 22 above the second support.

In this arrangement, the second radiators 42 in conjunction with the metallization 34 are designed to emit and receive electromagnetic radiation in a second frequency band and the first radiator 22 in conjunction with the metallization 34 is designed to radiate and receive electromagnetic radiation in a first frequency band. The frequencies of the first frequency band are lower than the frequencies of the second frequency band.

The first and second radiators 22, 42 are arranged such that one of the dipole halves of the first radiator 22 and one of the dipole halves of one of the second radiators 42 are parallel and in particular in extension of one another if seen a top view.

Further, the dipole halves may have a section each that run directly adjacent to one another, for example with a distance less than 5 mm.

Further, as can be seen in FIG. 2, the first support 20 and the second support 40 are arranged parallel to each other so that a gap 56 is formed between the first support 20 and the second support 40, in particular between the substrate 24 and the substrate 32 of the first and second support 20, 40, respectively.

To this end, the first support 20 and/or the second support 40 comprise a protrusion 57 extending in direction towards the other support 40, 20 and abutting the other support 40, 20 in the assembled position. The length of the protrusion 57 corresponding to the size of the gap 56, thus defining the gap 56. Due to the metallization 34 on the top side of the first support 20 and the optional full metallization 47 of the top side T of the second support 40, the gap 56 may be shielded.

If the second support 40 comprises the metallization 47, the first feeding lines 36 and/or the second feeding lines 46 are stripline transmission lines.

The first band assembly 16 and the second band assembly 18, in particular the first radiator 22 and the second radiators 42, can be seen as a single cell 12 of the multi-band antenna 14.

By constructing the first band assembly 16 and the second band assembly 18 as two separate assemblies that can be inserted into one another, a very simple and cost-efficient way of manufacturing a multi-band antenna 14 is provided.

FIGS. 7 to 10 show further embodiments of a multi-band antenna 14 according to the invention. The further embodiments correspond substantially to the first embodiment so that only the differences are discussed in the following and the same and functionally the same components are labeled with the same reference signs.

Figure 7:
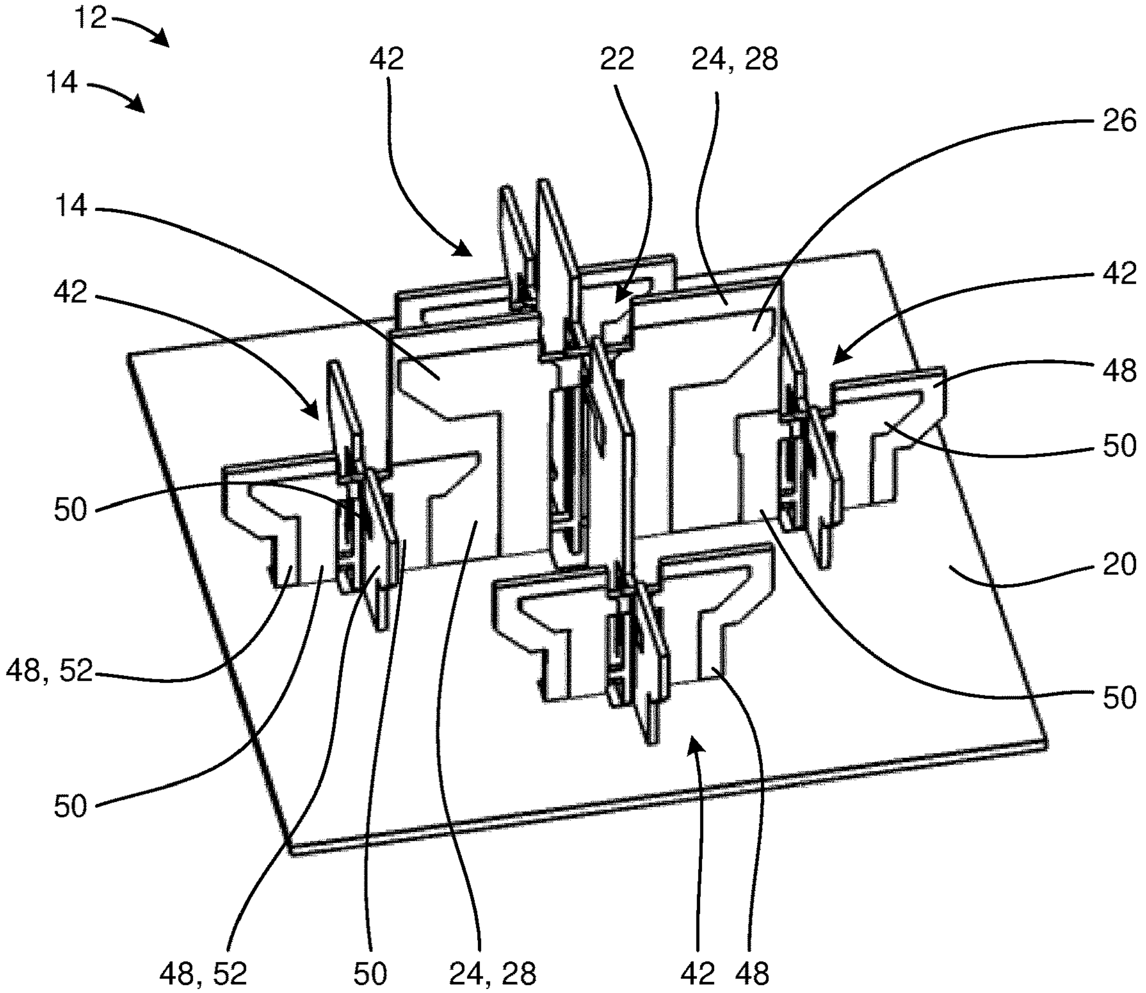
FIG. 7: shows a multi-band antenna according to a second embodiment of the invention in a perspective view.

FIG. 7 shows a second embodiment of a multi-band antenna 14, wherein for the sake of simplicity, only the first support 20 is shown.

In this embodiment, the conductor 50 of each second radiator 42 forming the dipole half nearest to the first radiator 22 and the conductor 26 of the corresponding dipole half of the first radiator 22 are arranged on the same wing 28 of the first radiator 22.

Thus, the wings 28 of the first radiator 22 comprise two conductors 26, 50 each, wherein the conductors 26 is part of the first radiator 22 and the conductor 50 is a functional part of the second radiator 42.

In a top view, the conductors 26, 50 on the same wing 28 overlap with one another, wherein the conductor 50 of the second radiator 42 is arranged below the conductor 26, i.e. closer to the first support 20.

The conductor 50 forming part of the second radiator 42 is galvanically contacted by the bridge 54 of the corresponding second radiator 42 when the second radiator 42 extends through the corresponding cut-out 38 in the first support 20.

Consequently, the second radiators 42 only comprise three wings 52 as one of the wings 52 is provided by the first radiator 22. Thus, the outer contour of the second radiator 42 on the second support 40 has a T-shape so that the corresponding cut-out 38 in the first support 20 has also a T-shape.

Figure 8:
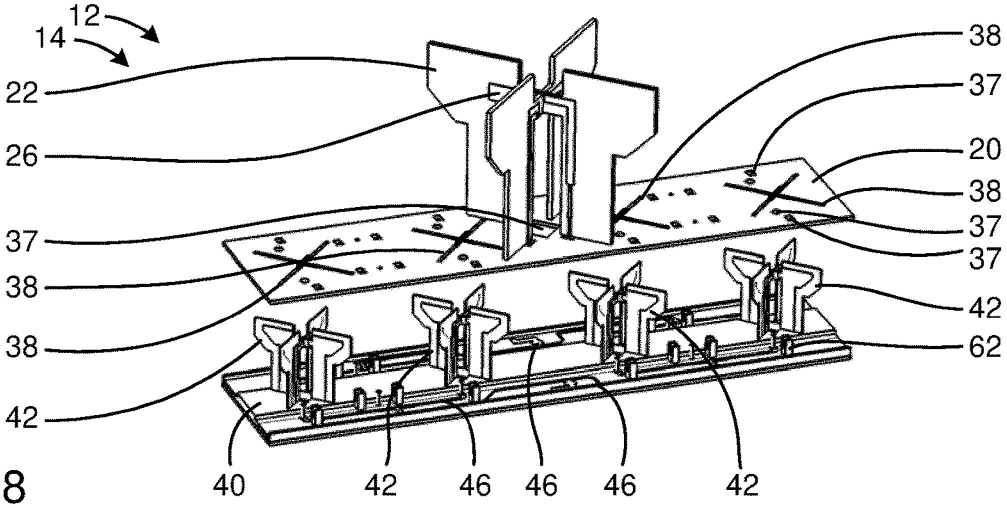
FIG. 8: shows a multi-band antenna according to a third embodiment of the invention.
Figure 9:
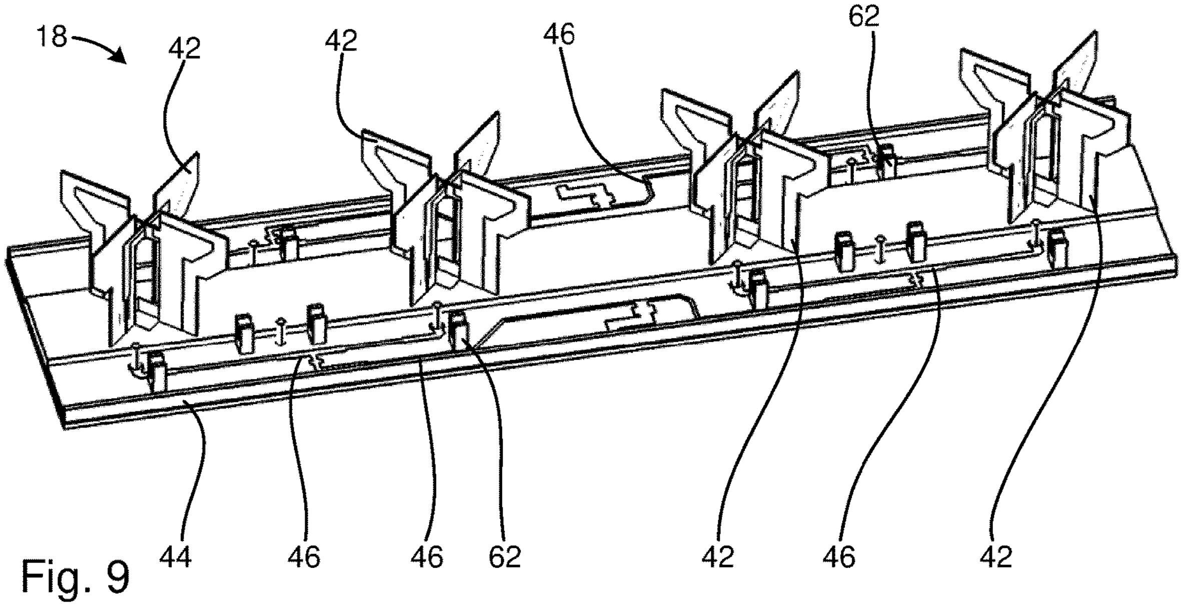
FIG. 9: shows the second band assembly of the antenna according to FIG. 8, and FIG. 10: shows a sectional view of the second band assembly according to FIG. 9.
Figure 10:
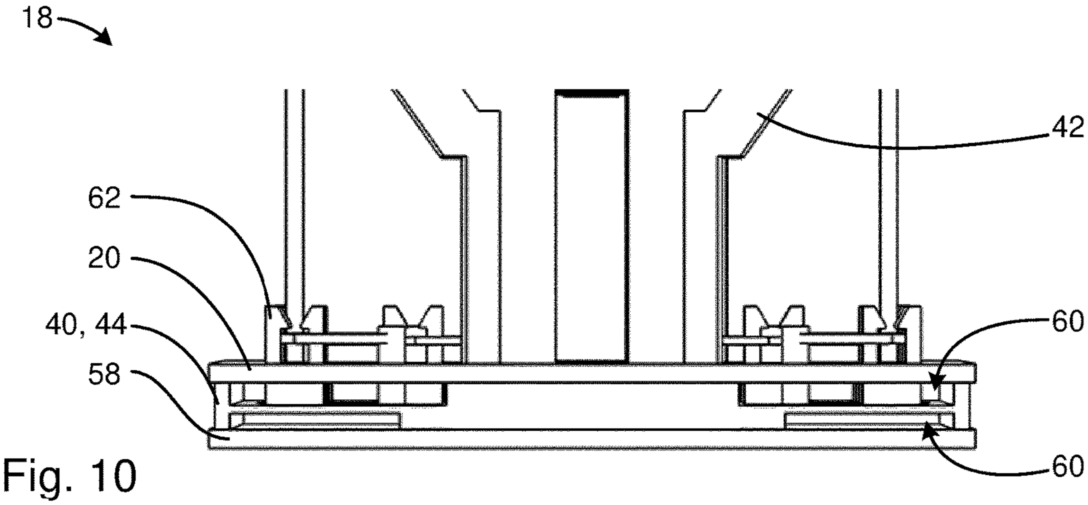

FIGS. 8 to 10 show a third embodiment of the multi-band antenna 14.

FIG. 8 shows an exploded view of the multi-band antenna 14, whereas FIG. 9 shows the second band assembly 18 only.

A first difference between the first and third embodiment lies in the fact that the second radiators 42 are not arranged around the first radiator 22 but in a line.

As another difference, the first support 20 in the third embodiment is a metal plate having the opening 37 and cut-outs 38.

The first radiator 22 is still attached to the top side T of the first support. The first radiator 22 may still be a single MID.

FIG. 10 shows a cross-section through the multi-band antenna 14 showing that the multi-band antenna 14 in the third embodiment comprises a bottom plate 58 which is, for example, a metal plate.

The bottom plate 58 is attached to the bottom side B of the second support 40.

In this embodiment, the second support 40, in particular its substrate 44, comprises recesses 60, either extending from the top side T and covered by the first support 20 or extending from the bottom side B and covered by the bottom plate 58.

In the recesses 60, the first and/or second feeding lines 36, 46 may be arranged such that they are shielded in a similar way as provided the gap 56.

Further, holders 62 for transmission lines may be provided at the second support 40, in particular its substrate 44.

For contacting the first and second radiators 22, 42, the first support 20 comprises further openings 37 through which the feeding lines 36, 46 and/or the holders 62 extend.

On the top side T of the first support 20, wires (not shown) may be inserted into the holders 62 forming part of the distribution network of the first or second feeding lines 36, 46.

In this embodiment, the construction of the first support 20 is simplified further, as a metal plate can easily be manufactured.

It is of course possible, that the feeding of the first radiator 22 and the second radiators 42 is done without further wires on the top side T of the first support 20 but instead with contacts in a similar way as in the first embodiment.

Of course, the features shown in the various embodiments can be used separately or together in any combination.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A multi-band antenna, comprising a first band assembly and at least one second band assembly, wherein the first band assembly comprises a first support and at least one first radiator for frequencies in a first frequency band, the at least one first radiator extending from a top side of the first support upwards, wherein the second band assembly comprises a second support and at least one second radiator mounted to the second support for frequencies in a second frequency band, wherein the second radiator is a dual-polarized radiator with two dipoles, and wherein the second support is arranged below the first support, and wherein the first support comprises at least one cut-out associated with the at least one second radiator, and the at least one second radiator extends through the associated cut-out in the first support and further from the top side of the first support upwards, wherein the first support provides a reflector for the at least one first radiator and the at least one second radiator.

2. The antenna according to claim 1, wherein the top side of the first support and/or the top side of the second support comprises a metallization.

3. The antenna according to claim 1, wherein first feeding lines for the at least one first radiator are arranged on the first support and/or wherein second feeding lines for the at least one second radiator are arranged on the second support.

4. The antenna according to claim 1, wherein the first support and the second support are parallel to each other, wherein the first support and the second support are spaced apart by a gap.

5. The antenna according to claim 1, wherein the at least one first radiator and/or the at least one second radiator comprises a substrate and at least one conductor being applied to the substrate.

6. The antenna according to claim 5, wherein the first support and the substrate of the at least one first radiator are of a single piece and/or that the second support and the substrate of the at least one second radiator are of a single piece.

7. The antenna according to claim 1, wherein the first band assembly and/or the second band assembly is a molded integrated device.

8. The antenna according to claim 1, wherein the at least one second radiator has an outer contour in a top view, wherein the contour of the associated cut-out in the first support corresponds to the contour of the at least one second radiator.

9. The antenna according to claim 1, wherein first radiator is a dual-polarized radiator.

10. The antenna according to claim 9, wherein the dual-polarized radiators have a linear polarization with a polarization plane, wherein the contour of the cut-outs extends in or parallel to the polarization plane.

11. The antenna according to claim 9, wherein the antenna comprises four second radiators associated with and arranged around the first radiator.

12. The antenna according to claim 9, wherein the conductors of the second radiators forming one of the dipole halves associated with the first radiator are each provided on the respective substrate of the first radiator providing one of the dipole halves of the respective first radiator.

13. The antenna according to claim 1, wherein the first support comprises a metal plate and/or wherein a bottom plate is attached to the second support.

14. The antenna according to claim 1, wherein one of the at least one first radiator and associated second radiators of the at least one second radiators form a single cell, wherein the antenna comprises a plurality of cells.

15. A mobile communication base station having the antenna according to claim 1.

* * * * *